Feb. 18, 1958 A. S. HARLAN 2,823,806
VACUUM FILTER
Filed Aug. 17, 1954 2 Sheets-Sheet 1

INVENTOR.
AVERY S. HARLAN.
BY
Lockwood, Galt, Woodard & Smith
ATTORNEYS.

Feb. 18, 1958
A. S. HARLAN
2,823,806
VACUUM FILTER
Filed Aug. 17, 1954
2 Sheets-Sheet 2
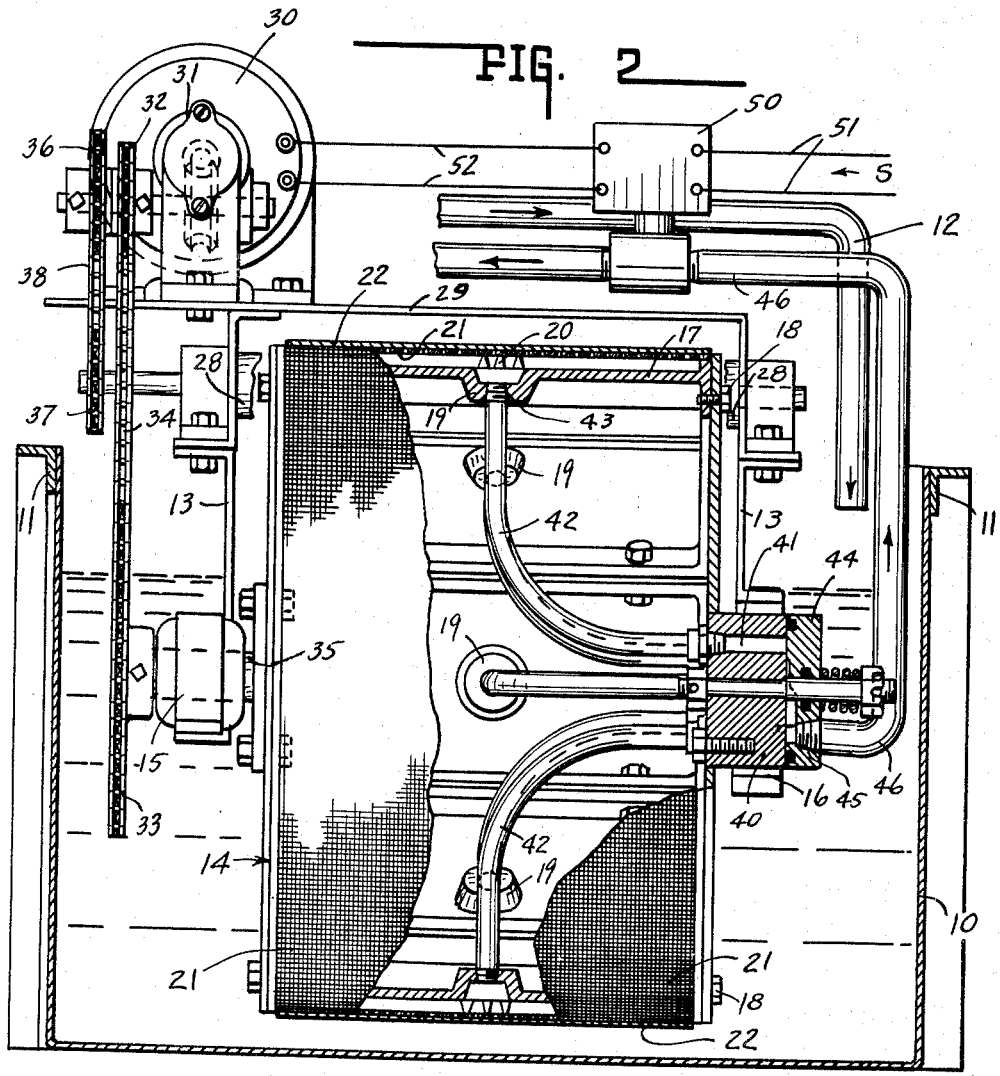
FIG. 2
FIG. 3
INVENTOR.
AVERY S. HARLAN.
BY
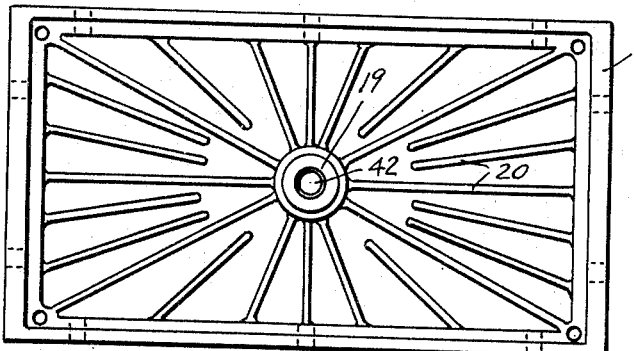
ATTORNEYS.

United States Patent Office 2,823,806
Patented Feb. 18, 1958

2,823,806

VACUUM FILTER

Avery S. Harlan, Indianapolis, Ind., assignor to Industrial Filtration Company, Indianapolis, Ind., a co-partnership Application August 17, 1954, Serial No. 450,413

5 Claims. (Cl. 210—387)

This invention relates to a vacuum filter wherein a filter paper, cloth or like filter media is intermittently passed about a suction surface within a tank of liquid to be filtered, suction being applied to the filter media to draw the liquid therethrough, leaving the residue to be carried from the tank by the filter media.

More particularly, the invention contemplates the mounting of a drum within a tank of liquid to be filtered, said drum being provided about its periphery with a supporting grid and screen over which filter media is carried from a supply roll. A plurality of vacuum tubes extends through the hub of the drum and terminates adjacent the supporting screen and filter media at spaced intervals to rotate with the drum. The source of vacuum is connected through a control valve with the vacuum tubes so as to apply a vacuum through the filter media and tubes when said tubes are emersed in the liquid for drawing the liquid through the filter media to be discharged free of foreign matter as filtered liquid.

One feature of the invention resides in an automatic intermittent drive for the drum and filter media. This drive is controlled by a vacuum switch in the service line of an electric driving motor. This arrangement is such that when the filter media is unclogged by foreign matter, the vacuum will freely draw the liquid through the submerged tubes, during which the motor is deenergized and the drum is stationary. However, upon the media being clogged with the foreign matter to be filtered out, the vacuum pressure will increase, causing the vacuum switch to close the circuit to the motor for imparting rotation to the drum. Such rotation will draw a fresh section of filter media about the submerged portion of the drum, whereupon the vacuum pressure will decrease, causing the vacuum switch to break the circuit to the motor and arrest the drum in position to present a fresh section of filter media for a new filtering cycle.

Another feature of the invention resides in a vacuum control valve provided with a minutely restricted vacuum passage communicating with the vacuum tubes when passing beyond the liquid level of the tank, such as to induce a very limited and restricted vacuum pull over the unsubmerged portion of the drum sufficiently and to an extent to hold the film of foreign matter on the filter media and prevent it from dropping off, until the filter media reaches an approximately horizontal position for discharge.

Other features of the invention will be more particularly set forth and described in the following specifications as shown in the accompanying drawings.

The full nature of the invention will be understood from the accompanying drawings and the following description and claims:

Fig. 2 is a section taken on the line 2—2 of Fig. 1, but with portions of the drum and supporting screen shown in elevation.

Fig. 3 is a plan view showing the layout of one of the sectional grid plates secured about the periphery of the drum.

Fig. 4 is a section taken on the line 4—4 of Fig. 1 showing a portion of the hub and the vacuum control valve.

Figure 1:
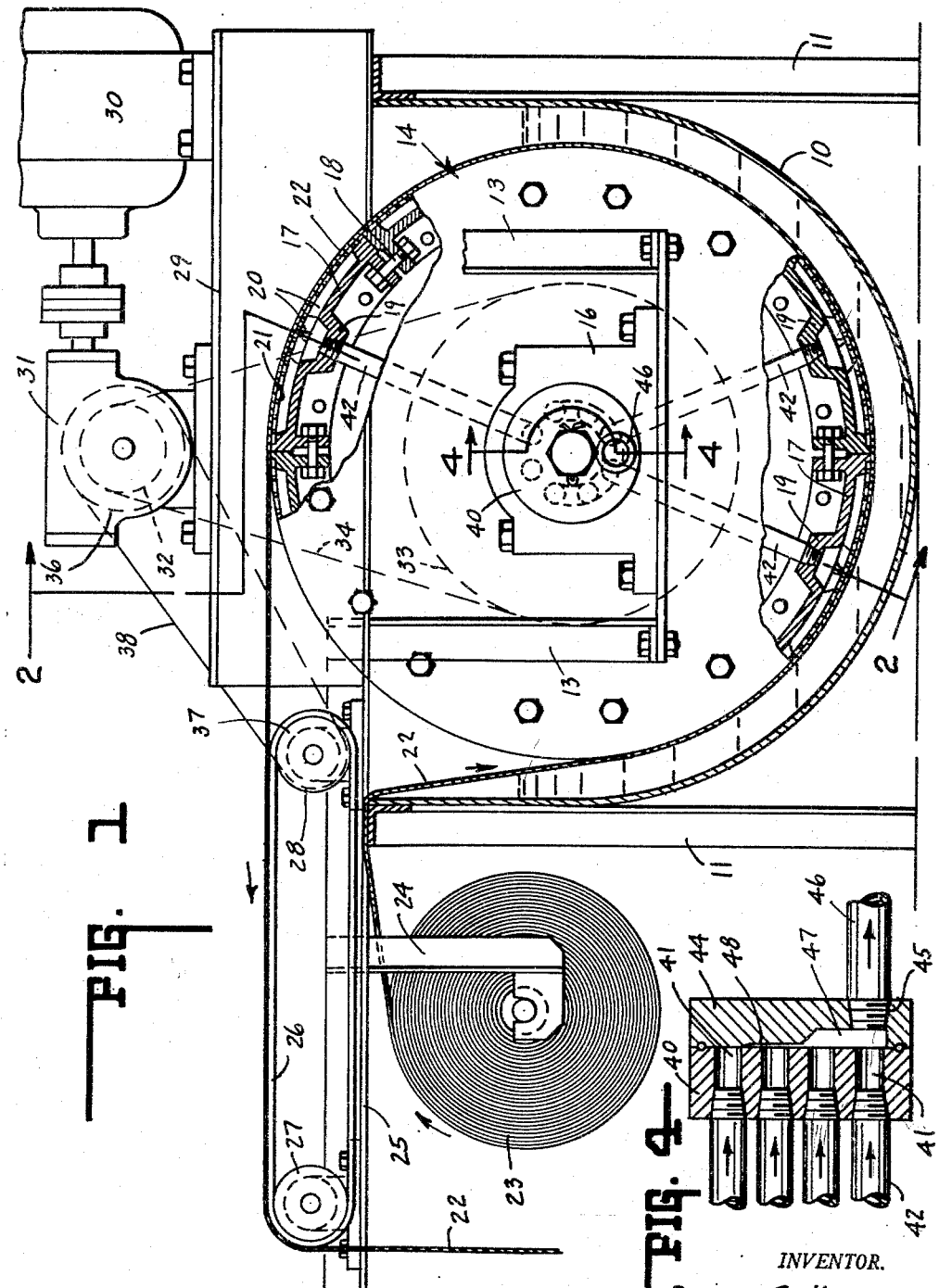
Fig. 1 is a view through a section of a filter tank showing the drum submerged therein with portions of the drum broken away and shown in section.

In the drawings there is shown a vacuum drum filter partially submerged in a fluid receiving tank 10 supported on a mounting frame 11 into which the liquid to be filtered is discharged through a pipe 12. Said liquid is usually discharged into the tank from a cutting or grinding machine or the like, or from any other source, such as brine tanks. Thus, the filter is particularly adapted for filtering out metal particles and other foreign matter from a coolant for cutting and grinding machines, salt from a brine or any like foreign matter carried by the liquid.

Supported within the tank by a bracket 13 there is an annular filter drum 14 rotatably supported on the bearing mountings 15 and 16 on each side thereof. Said drum is made up of a series of open arcuate grid plate sections 17, as shown in Fig. 3, bolted together at their ends as indicated at 18. Said grid sections forming the periphery of the drum are each formed with a central boss 19 from which extend a radially disposed series of ribs 20. Secured about the periphery of the drum and supported by the grid plates there is provided a fine mesh screen 21 for carrying and supporting an endless strip of filter media 22.

The filter media is drawn about the drum from a supply roll 23 rotatably supported by a depending bracket 24 from an overhanging extension 25 of the drum-supporting bracket 13. Mounted upon said extension there is an endless conveyor belt 26 carried at each end by the rollers 27 and 28, respectively. Mounted on a platform 29 above the drum there is an electric driving motor 30 having its shaft coupled to a reduction gearing within a housing 31. Through the reduction gearing there is driven a sprocket 32 which drives a sprocket 33 through a drive chain 34, said sprocket 33 being secured to the stub shaft 35 of the drum extending through the bearing 15. Also, driven through the reduction gearing there is a second sprocket 36 which drives a sprocket 37 through a chain 38. Thus, the sprocket 32 drives the drum and the sprocket 36 drives the conveyor 26 in such timed relation as to move at the same linear speed for feeding the filter media 22 from the supply roll 23 about the screen periphery of the drum onto the conveyor belt 26 to be finally discharged therefrom over the roller 27.

One side of the drum is provided with a valve hub 40 having an annular series of spaced ports 41 extending therethrough and threaded at their inner ends to receive a corresponding series of vacuum tubes 42. Each of said tubes has a threaded connection at 43 with the central bosses 19 of the respective grid plates. Fixedly mounted upon the bearing 16 so as to remain stationary during rotation of the drum there is a valve disk 44 held in sealing relation with the valve hub while permitting relative rotation thereof. Said valve disk is provided with a port 45 in which there is threaded a main vacuum line 46 leading to a source of vacuum. The port 45 is in communication with an arcuate recess of substantial depth, as indicated at 47, merging into an extremely shallow restricted recess at one end thereof.

The valve disk is so positioned relative to the valve hub that the ports therein connected with the vacuum tubes 42 are caused to register with an arcuate recess 47 of substantial depth whereby there will be unrestricted vacuum pull on those vacuum tubes opening into the submerged periphery of the drum. As the drum is caused to rotate relative to the valve disk the ports 41 connected with those tubes 42 which are rotated out of and above the liquid level, will continue to be connected with the vacuum line in a very restricted manner through a restricted recess 48 until the rotation of the drum carries such tube to approximately the top of the drum, whereupon they will be disconnected until the drum again carries them to a position of submersion in the liquid. Thus, this arrangement is such that full vacuum pull to the extent of the partial vacuum induced upon the vacuum line will be transmitted to the submerged portion of the drum for creating a partial vacuum thereabout and thereby draw or suck the liquid through the filter media, such as filter paper, the screen 21 and open grid 17, the liquid being discharged through the vacuum line back to the machine or other receptacle for filtering liquid.

Such foreign matter as is filtered out and adheres to the filter media will be retained thereon due to the vacuum and carried by rotation of the drum to its uppermost periphery and thence carried away on the conveyor 26 for discharge at the end thereof. A substantial film or cake of such foreign matter will thus be held upon the filter media by the full vacuum through the recess 47 until it emerges above the liquid level. Thereupon the restricted suction through the recess 48 will be sufficient to prevent it from sliding back or falling off the filter media until it has been advanced to the upper portion of the drum and carried onto the conveyor.

Connected with the filter line there is a vacuum switch 50 in series with the motor 30 from the source of electric current S, as indicated by the lines 51 and 52. This controls the intermittent drive of the drum. When the filter media, such as the filter paper 22, is sufficiently free of caked foreign matter as to permit sufficient filtering action, the vacuum pressure will be low in the vacuum lines 46, which will cause the vacuum switch to break the circuit to the motor. The drum then remains stationary during a filtering cycle. Upon the filter media being so clogged as to become inefficient in its filtering action, the vacuum pressure will rise, causing the vacuum switch to close and make the circuit to the motor which will then drive the drum to bring a fresh section of filter media into filtering position from the supply roll 23. Upon a fresh section of media being brought into filtering position, the vacuum pressure will drop, causing the switch to break the circuit to the motor, whereupon the drum again remains stationary for another filtering cycle. As the drum is thereby caused to rotate intermittently between filtering cycles, the filtering media will be carried over the conveyor 26 for discharge.

The invention claimed is:

1. A filter for filtering liquid from a tank comprising a drum rotatably mounted on said tank with the lower surface thereof submerged in the liquid, a disposable filtering media carried by said drum about the submerged surface thereof, means for rotating said drum to progressively move said filtering media covered surface through said liquid, a plurality of vacuum tubes extending into said drum communicating with the peripheral surface thereof at spaced intervals and having a source of partial vacuum for drawing said liquid through said filter media to separate foreign matter therefrom, a control valve interposed between said tubes and source of partial vacuum for opening said tubes to said source upon the adjacent surface of said drum being submerged and closing said tubes from said source upon the adjacent surface of said drum rotating to un unsubmerged position, and an endless conveyor belt associated with said drum and driven in timed relation therewith for receiving and disposing of said disposable filtering media upon said drum rotating to carry it from its submerged position.

2. A vacuum filter for filtering liquid from a tank comprising a drum rotatably mounted within said tank with a portion of its peripheral surface submerged within the liquid contained therein, a roll of filter media mounted adjacent said drum positioned to extend about a substantial portion of the surface thereof including the submerged portion, a conveyor for receiving said filter media from said drum after passing about the submerged portion thereof, a motor for periodically driving said drum and conveyor in timed relation, a plurality of vacuum tubes mounted in the hub of said drum and extending into close relation with said filter media at spaced intervals, a valve operable to progressively connect said tubes with a source of vacuum upon the free ends of said tubes adjacent the filter media becoming submerged and closing said tubes to said source upon said tubes being free of submersion, said valve comprising a fixed disk intermediate said tubes and source, said disk having an arcuate recess for registering with said submerged tubes when rotated to submerged position, and which recess terminates at one end thereof in a restricted passage communicating with said tubes upon their emerging from the liquid to provide a low vacuum pull on the emerging merging portion of the drum, and a vacuum switch connected with the vacuum line of said valve for causing said drum to be intermittently driven to bring a fresh section of filter media into filtering position upon the preceding section becoming clogged with foreign matter such as to induce a differential vacuum pressure in said switch.

3. A vacuum filter for filtering liquid from a tank comprising a drum rotatably mounted within said tank with a portion of its peripheral surface submerged within the liquid contained therein, a roll of filter media mounted adjacent said drum positioned to extend about a substantial portion of the surface thereof including the submerged portion, a conveyor for receiving said filter media from said drum after passing about the submerged portion thereof, a motor for periodically driving said drum and conveyor in timed relation, a plurality of vacuum tubes mounted in the hub of said drum and extending into close relation with said filter media at spaced intervals, a valve operable to progressively connect said tubes with a source of vacuum upon the free ends of said tubes adjacent the filter media becoming submerged and closing said tubes to said source upon said tubes being free of submersion, and a switch connected in circuit with said motor controlled by the rate of liquid filtering for causing said drum to be intermittently driven to bring a fresh section of filtering media into filtering position upon the preceding section becoming clogged with foreign matter such as to reduce its rate of filtering.

4. A vacuum filter for filtering foreign matter from liquid in a tank comprising a drum rotatably mounted within said tank with a portion of its peripheral surface submerged within the liquid contained therein, a roll of filter media mounted adjacent said drum positioned to extend about a substantial portion thereof including the submerged portion, a motor for periodically rotating said drum, a plurality of vacuum tubes extending into said drum with their free ends in close relation with said filter media at spaced intervals, and a valve operable to progressively open said tubes to a source of vacuum upon the free ends of said tubes adjacent the filter media becoming submerged and closing said tubes to said source prior to submersion, said valve comprising means operable to provide a low vacuum pull through said tubes upon emerging from the liquid to retain the filtered out foreign matter on said filter media as it is carried by said drum from submersion.

5. A vacuum filter for filtering liquid from a tank comprising a drum rotatably mounted within said tank with a portion of its peripheral surface submerged within the liquid contained therein, a roll of filter media mounted adjacent said drum positioned to extend about a substantial portion thereof including the submerged portion, a plurality of vacuum tubes carried by said drum and extending into close relation with said filter media at spaced intervals, a vacuum line connected with a source of vacuum, a valve in said line operable to progressively open said tubes to said source upon the free ends of said tubes adjacent the filter media becoming submerged and closing said tubes to said source prior to submersion, a motor for periodically rotating said drum, and a vacuum switch connected with the vacuum line of said valve for causing said drum to be intermittently driven to bring a fresh section of filter media into filtering position upon the preceding section becoming clogged with foreign matter such as to induce a differential vacuum pressure in said switch.

References Cited in the file of this patent

UNITED STATES PATENTS

| | | |
|---|---|---|
| 1,590,401 | Wright et al. | June 29, 1926 |
| 2,197,610 | Fedeler | Apr. 16, 1940 |
| 2,461,824 | Komline | Feb. 15, 1949 |
| 2,633,993 | Biggar | Apr. 7, 1953 |
| 2,675,129 | Doubleday | Apr. 13, 1954 |

FOREIGN PATENTS

| | | |
|---|---|---|
| 805,309 | France | Aug. 22, 1936 |